(12) United States Patent
Tan et al.

(10) Patent No.: US 9,714,727 B2
(45) Date of Patent: Jul. 25, 2017

(54) FLEXIBLE PIPE SUPPORT

(71) Applicant: GE Oil & Gas UK Limited, Houston, TX (US)

(72) Inventors: Zhimin Tan, Katy, TX (US); Michael David Powell, Houston, TX (US); Yanqiu Zhang, Houston, TX (US); Thomas Kolanski, Houston, TX (US)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 0 days.

(21) Appl. No.: 14/932,800

(22) Filed: Nov. 4, 2015

(65) Prior Publication Data

US 2016/0053919 A1    Feb. 25, 2016

Related U.S. Application Data

(63) Continuation of application No. 12/743,217, filed as application No. PCT/GB2008/003550 on Oct. 20, 2008, now abandoned.

(30) Foreign Application Priority Data

Nov. 16, 2007 (GB) .................................. 0722459.5

(51) Int. Cl.
| | |
|---|---|
| F16L 1/24 | (2006.01) |
| F16L 3/16 | (2006.01) |
| E21B 17/01 | (2006.01) |
| F16L 1/16 | (2006.01) |
| F16L 11/133 | (2006.01) |
| F16L 3/26 | (2006.01) |

(52) U.S. Cl.
CPC .............. *F16L 3/16* (2013.01); *E21B 17/015* (2013.01); *F16L 1/163* (2013.01); *F16L 1/24* (2013.01); *F16L 3/26* (2013.01); *F16L 11/133* (2013.01); *Y10T 137/0318* (2015.04)

(58) Field of Classification Search
CPC ...................................... F16L 1/24; F16L 1/20
See application file for complete search history.

(56) References Cited

U.S. PATENT DOCUMENTS

| | | | |
|---|---|---|---|
| 3,173,271 A | 3/1965 | Wittgenstein | |
| 3,295,489 A * | 1/1967 | Bossa | ..................... B63B 22/18 114/230.2 |

(Continued)

FOREIGN PATENT DOCUMENTS

| | | |
|---|---|---|
| EP | 0396391 A | 11/1990 |
| EP | 1022501 A1 | 7/2000 |

(Continued)

OTHER PUBLICATIONS

International Search Report of the International Searching Authority, mailed Feb. 24, 2009, for corresponding International Application No. PCT/GB2008/003550.

(Continued)

*Primary Examiner* — Frederick L Lagman
(74) *Attorney, Agent, or Firm* — Klarquist Sparkman, LLP

(57) ABSTRACT

A method and apparatus are disclosed for supporting a flexible pipe. The method includes the steps of responsive to a change in at least one condition experienced by a flexible pipe, varying an amount of support provided at at least one location on the flexible pipe.

21 Claims, 3 Drawing Sheets

(56) References Cited

U.S. PATENT DOCUMENTS

| | | | |
|---|---|---|---|
| 3,583,169 A | | 6/1971 | Morgan |
| 4,011,729 A | * | 3/1977 | Kermel .................. F16L 1/165 |
| | | | 405/158 |
| 4,056,944 A | | 11/1977 | Lamy |
| 4,063,430 A | | 12/1977 | Lamy |
| 4,065,822 A | * | 1/1978 | Wilbourn ............. B63B 22/021 |
| | | | 114/230.22 |
| 4,107,933 A | | 8/1978 | Lamy |
| 4,110,994 A | * | 9/1978 | Lundh .................... B63B 21/50 |
| | | | 405/158 |
| 4,135,844 A | | 1/1979 | Lamy |
| 4,145,909 A | | 3/1979 | Daughtry |
| 4,159,189 A | | 6/1979 | Todd et al. |
| 4,183,697 A | | 1/1980 | Lamy |
| 4,263,004 A | | 4/1981 | Joubert et al. |
| 4,363,566 A | | 12/1982 | Morton |
| 4,459,065 A | | 7/1984 | Morton |
| 5,356,321 A | | 10/1994 | Boatman et al. |
| 5,944,448 A | | 8/1999 | Williams |
| 6,030,145 A | | 2/2000 | Stewart et al. |
| 6,200,180 B1 | | 3/2001 | Hooper |
| 7,025,533 B1 | | 4/2006 | Mungall et al. |
| 7,287,936 B2 | | 10/2007 | Streiff et al. |
| 2005/0158126 A1 | | 7/2005 | Luppi |
| 2005/0196243 A1 | | 9/2005 | Pollock et al. |
| 2006/0034665 A1 | | 2/2006 | Bryant |
| 2006/0159521 A1 | | 7/2006 | Streiff et al. |
| 2009/0103984 A1 | * | 4/2009 | Zarisfi ...................... F16L 1/14 |
| | | | 405/168.1 |
| 2009/0293792 A1 | * | 12/2009 | Alliot .................... B63B 21/66 |
| | | | 114/244 |
| 2010/0034594 A1 | | 2/2010 | Major |

FOREIGN PATENT DOCUMENTS

| | | |
|---|---|---|
| GB | 1534252 | 11/1978 |
| GB | 2173160 A | 10/1986 |
| GB | 2377002 A | 12/2002 |
| GB | 2404428 A | 2/2005 |
| WO | WO99/66169 | 12/1999 |
| WO | WO03/031765 A1 | 4/2003 |
| WO | WO2007/017574 A1 | 2/2007 |

OTHER PUBLICATIONS

International Preliminary Report on Patentability and Written Opinion of the International Searching Authority, mailed May 27, 2010, for corresponding International Application No. PCT/GB2008/003550.

Search Report from the European Patent Office for corresponding European Patent Application No. EP08849638.5-2315, Mar. 18, 2011, 4 pages.

Third party observations filed with European Patent Office in European Patent Application No. EP08849638.5-2315, May 16, 2011, 3 pages.

Office Action from the United States Patent & Trademark Office in U.S. Appl. No. 12/743,217, dated Jan. 22, 2013.

Office Action from the United States Patent & Trademark Office in U.S. Appl. No. 12/743,217, dated Aug. 1, 2013.

Office Action from the United States Patent & Trademark Office in U.S. Appl. No. 12/743,217, dated Jan. 15, 2014.

European Patent Office, "Communication of a notice of opposition" for European Application No. EP08849638.5-1610, Jan. 29, 2014, 6 pages.

Notice of Opposition to European Patent Application No. 08849638.5 by Technip France, Statement of Facts and Arguments, Jan. 22, 2014, 41 pages.

American Petroleum Institute, "Recommended Practice for Flexible Pipe," API Recommended Practice 17B, Third Edition, Mar. 2002, 165 pages.

Office Action from the United States Patent & Trademark Office in U.S. Appl. No. 12/743,217, dated Aug. 29, 2014.

Office Action from the United States Patent & Trademark Office in U.S. Appl. No. 12/743,217, dated May 5, 2015.

Grounds for Decision from the European Opposition Division of the European Patent Office for corresponding European Application No. EP08849638.5, Jan. 20, 2017, 15 pages.

\* cited by examiner

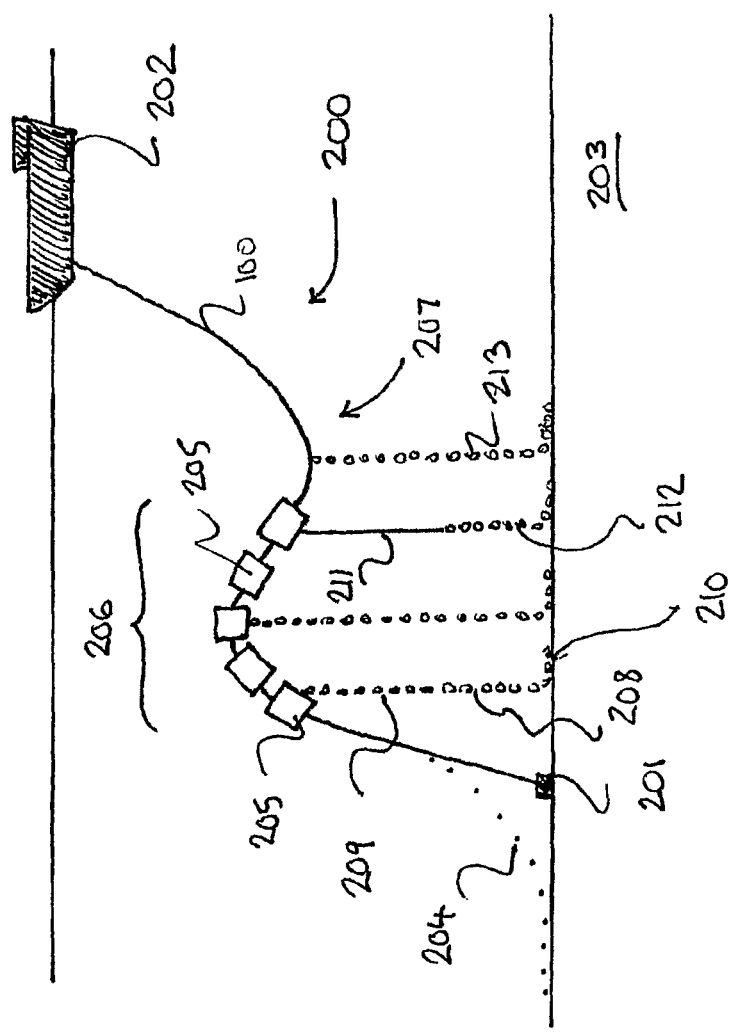

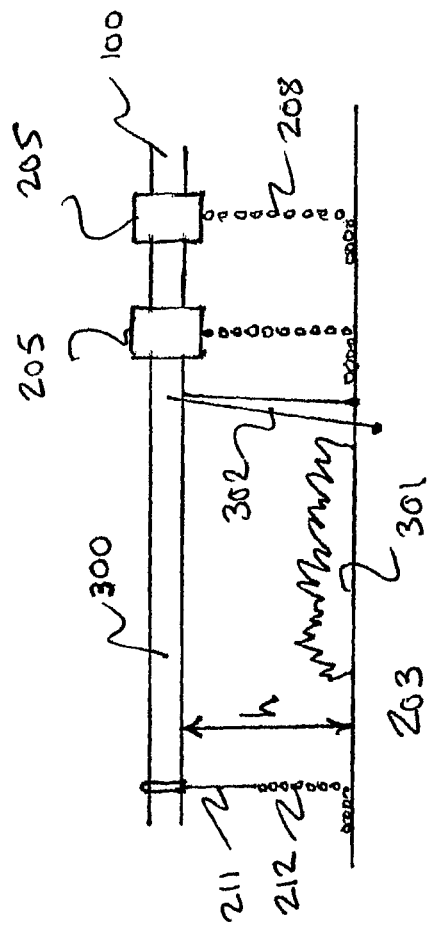

FLEXIBLE PIPE SUPPORT

This is a continuation of U.S. patent application Ser. No. 12/743,217, filed Mar. 9, 2011, which is the U.S. National Stage of International Application No. PCT/GB2008/003550, filed Oct. 20, 2008, which in turn claims the benefit of Great Britain Application No. GB0722459.5, filed Nov. 16, 2007.

The present invention relates to flexible pipe of the type suitable for transportation of production fluids. In particular, but not exclusively, the present invention relates to a method of supporting a flexible pipe so that an amount of support provided to the flexible pipe is varied responsive to changes in one or more conditions experienced by the flexible pipe.

Traditionally flexible pipe is utilised to transport production fluids, such as oil and/or gas and/or water, from one location to another. Flexible pipe is particularly useful in connecting a sub-sea location to a sea level location. Flexible pipe is generally formed as an assembly of a flexible pipe body and one or more end fittings. The pipe body is typically formed as a composite of layered materials that form a fluid and pressure-containing conduit. The pipe structure allows large deflections without causing bending stresses that impair the pipe's functionality over its lifetime. The pipe body is generally, but not necessarily, built up as a composite structure including metallic and polymer layers.

Flexible pipe may be utilised as a flowline. Under certain conditions the pipe is required to remain at a controlled height above a sea bed. For example, when bridging unstable, aggressive environmentally sensitive or active sea bed conditions. This is currently difficult to achieve with known techniques.

A flexible riser is a flexible pipe used to connect a compliant top side structural system with a sea bed location. A flexible riser system can be designed for many types of floating production structures and some well known riser configurations are free hanging catenary risers, lazy "S" risers, lazy "wave" risers, steep "wave" risers or the like. Such configurations are selectively suitable for use in shallow, medium, deep or ultra deep water depths.

During use it is appreciated that a flexible pipe riser is subjected to dynamic loading due to a number of possible conditions, for example due to motion of a vessel or platform on a surface of sea. Surge motion and heave motion of such surface bound vessel can particularly cause curvature changes in a riser configuration. It is generally advantageous to prevent shape changes or control such changes within predetermined limits.

Various techniques are known for mitigating the effects of heave and surge motion such as careful selection of surface vessel type and/or increasing overall strength of sections of riser, particularly near a sea bed touch down area.

Certain known techniques for mitigating the effects of vessel motion have also included the attachment of buoyancy modules at selected regions of the riser, for example near a top section, or in the middle, or near the touch down region.

It will be appreciated that the selection of a vessel type has little impact on design optimisation. Also attachment of buoyancy modules at upper regions of a riser have little effect on problems near the sea bed region. Also increasing overall strength of the section of pipe at lower regions increases cost and can have an impact on the life expectancy and integrity of pipe.

When utilising a wave configuration of riser problems can occur due to the attached buoyancy elements. In particular, during shallow water applications the riser configuration may float at the water surface or sink to a sea bed region due to sensitivity to content density change. Also where the depth of a riser system may vary due to internal fluid density changes or external environmental changes in non-shallow water environments use of risers with buoyancy aids has been limited.

It is an aim of the present invention to at least partly mitigate the above-mentioned problems.

It is an aim of embodiments of the present invention to provide a method of supporting a flexible pipe in a manner which permits an amount of support provided to the flexible pipe to be varied as conditions experienced by the flexible pipe change.

It is an aim of embodiments of the present invention to provide a wave configuration riser connecting a sea bed location to a surface location and in which support given by a buoyancy module or biasing element automatically varies so as to maintain the riser in an advantageous configuration wherever possible.

It is an aim of embodiments of the present invention to maintain flexible pipe at a desired height above a surface such as a sea bed.

According to a first aspect of the present invention there is provided a method of supporting a flexible pipe, comprising the steps of:

responsive to a change in at least one condition experienced by a flexible pipe, varying an amount of support provided at at least one location on the flexible pipe.

According to a second aspect of the present invention there is provided a flexible pipe for transporting production fluids, comprising:

a flexible pipe supported at at least one location wherein an amount of support provided to the pipe is variable responsive to a change in at least one condition experienced by the flexible pipe.

Embodiments of the present invention provide a practical solution for shallow water applications of a flexible riser wave configuration where the riser configuration may otherwise either float at the water surface or sink to the sea bed due to sensitivity to content density change.

Embodiments of the present invention provide the advantage of low installation costs and short installation times associated with wave configurations and yet provide the performance advantage enjoyed by an S wave riser configuration.

Embodiments of the present invention provide a riser suitable for use where the depth of the riser system may vary due to internal fluid density changes and/or external environmental changes. Such a compliant system is beneficial at any range of water depths. In this way the height of the flexible pipe above a sea bed or a shape adopted by the flexible pipe can be controlled.

Embodiments of the present invention will now be described hereinafter, by way of example only, with reference to the accompanying drawings in which:

FIG. 2 illustrates a wave configuration riser; and

FIG. 3 illustrates control of height above a sea bed for a flexible pipe flowline.

In the drawings like reference numerals refer to like parts.

Figure 1:
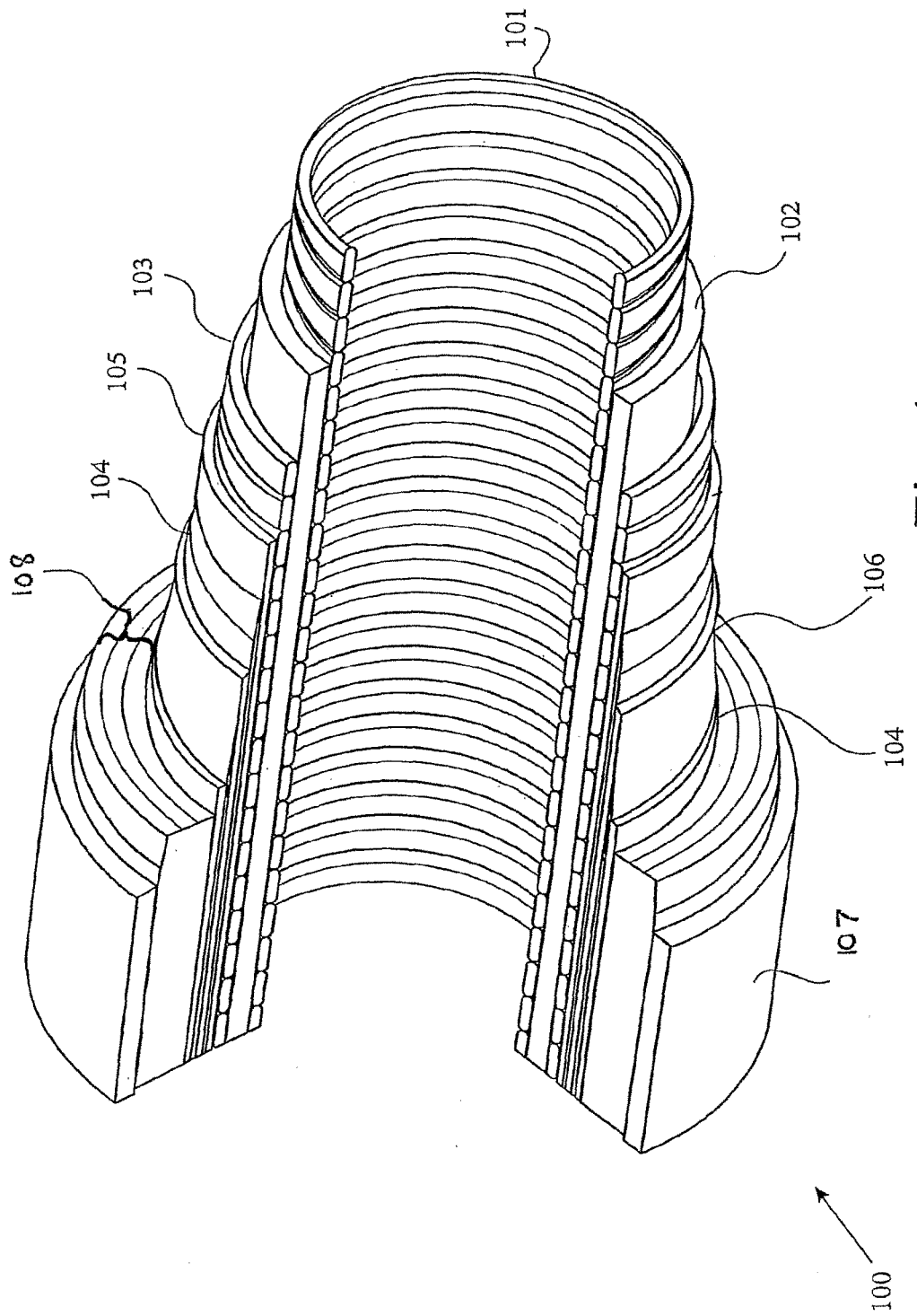
FIG. 1 illustrates flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 100 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, pipe body typically includes an innermost carcass layer 101. The carcass provides an interlocked metallic construction that can be used as the innermost layer to prevent, totally or partially, collapse of an internal pressure sheath 102 due to pipe decompression, external pressure, tensile armour pressure and mechanical crushing loads. It will be appreciated that embodiments of the present invention are applicable to 'smooth bore' as well as such 'rough bore' applications.

The internal pressure sheath 102 acts as a fluid retaining layer and typically comprises a polymer layer that ensures internal-fluid integrity. It is to be understood that this layer may itself comprise a number of sub-layers. It will be appreciated that when the optional carcass layer is utilised the internal pressure sheath is often referred to as a barrier layer. In operation without such a carcass (so-called smooth-bore operation) the internal pressure sheath may be referred to as a liner.

A pressure armour layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 104 and a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe body also typically includes an outer sheath 107 which comprises a polymer layer used to protect the pipe against penetration of seawater and other external environments, corrosion, abrasion and mechanical damage. One or more layers 108 of insulation may also be included.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 201 to a floating facility 202. For example, in FIG. 2 the sub-sea location 201 is a connection to a sub-sea flow line. The flexible flow line comprises a flexible pipe, wholly or in part, resting on the sea floor 203 or buried below the sea floor. The floating facility may be provided by a platform and/or buoy or, as illustrated in FIG. 2, a ship. The riser 200 is provided as a flexible riser, that is to say a flexible pipe connecting the ship to the sea floor installation.

The riser assembly 200 illustrated in FIG. 2 is arranged in a wave configuration. Notably the solid line illustrates a steep wave configuration riser whilst the dotted line 204 illustrates a lazy wave configuration. The shape adopted by the riser is determined by the buoyancy modules 205 secured along its length. As a result of including one or more of these buoyancy modules at least one wave consisting of a crest region 206 and a valley region 207 is formed between the touch down region around the sub-sea location 201 and the floating vessel 202. It will be appreciated that embodiments of the present invention are applicable to one or more wave regions in a riser.

Each buoyancy module 205 provides extra buoyancy to the flexible pipe. Buoyancy modules are known to those skilled in the art and may be secured to the flexible pipe in a variety of known ways.

As illustrated in FIG. 2, according to embodiments of the present invention weight chains 208 consisting of a length of interlocked links are secured to a number of the buoyancy modules. A weight chain 208 may be secured to each buoyancy module secured to the riser or may be selectively secured to only one or more of the buoyancy modules. The weight associated with the mass of chain in the length of chain counteracts the buoyancy provided by the buoyancy module to which the weight chain is secured and the inherent buoyancy of the flexible pipe.

A section 209 of the weight chain 208 hangs freely downwardly from the buoyancy module towards the sea bed 203. A further portion 210 of the weight chain rests upon the surface of the sea bed 203. In this way a part of the weight chain is laid on the sea bed. It will be appreciated that as conditions experienced by the flexible pipe change, such as when the density of content within the flexible pipe changes the result will be a tendency for the buoyancy modules and flexible pipe to move upwardly away from the sea bed or downwardly towards the sea bed. As such movement occurs more or less chain will rest upon the sea bed. For example, when the riser content density reduces the buoyancy will be balanced by the additional chain weight as it is lifted from the sea bed. When the riser content density increases the buoyancy will be balanced by reduced chain weight as the additional chain is laid on the sea bed. In this way the support provided to the flexible pipe is automatically and continually adjusted so as to maintain the flexible pipe in a desired configuration or at least in a configuration within predetermined threshold limits.

As illustrated in FIG. 2, as an alternative to a weight chain extending from the buoyancy module to the sea bed a top section 211 of a weight chain may be replaced or provided by an alternative flexible filament such as a synthetic rope, wire, cable or the like. A weight chain 212 is secured at a lower end region of the filament 211 so that again a portion of the weight chain rests upon the sea bed.

Also illustrated in FIG. 2 is a weight chain 213 which may be secured directly to the flexible pipe rather than to a buoyancy module.

None, one or a number of buoyancy modules may be selected together with the weights of the weight chains attached so as to optimise performance. The applied buoyancy modules help determine that the configuration always remains in a floating state even when the pipe weight reaches its heaviest possible state, for example due to marine growth, buoyancy loss, content density change and the weight of suspended chains.

The weight chains themselves may be trimmed at the sea bed during installation to ensure that a section of the chains remains on the sea bed at the lightest riser configuration. The length of the chain on the sea bed will be determined for the largest potential change, for example in the riser contents.

During installation a length of chain is attached to each selected buoyancy module or to the flexible pipe itself as it leaves an installation deck of an installation vessel and before it reaches the surface water. The rest of the chain is then lowered into the water after it is attached to the flexible pipe or buoyancy module. The riser is then paid out continually until the next buoyancy module reaches the installation deck for weight chain attachment.

FIG. 3 illustrates an alternative use of embodiments of the present invention in which support is provided to flexible pipe 300 arranged as a flowline 300. The flowline is provided with supports so as to ensure that a height h above the sea bed 203 is maintained at a fixed distance or at least within a range of distances. Embodiments of the present invention are particularly useful when a pipe is to span unfavourable or environmentally sensitive sea bed conditions in shallow, deep or ultra-deep water applications. As shown in FIG. 3, an area of coral 301 can be successfully bridged so that neither the coral or flexible pipe comes into contact. In order to help fix the flexible flowline in position, one or more tethers 302 are utilised to fix the lateral position of the flowline 300.

The system of the weight chain and inherent buoyancy or additional buoyancy modules acts as a self-buoyancy/weight adjusting device for automatically maintaining a working flexible pipe flowline, jumper or riser configuration. The system progressively mobilises additional weight as one or more chains are lifted off the sea bed as the weight of pipe contents reduces. The amount of buoyancy added to compensate for the weight of the chain may be reduced by replacing an upper (non-active) length of chain with wire or synthetic rope or the like. The system may be used for any circumstance where a flexible pipe is required to remain at a controlled height above the sea bed or in a controlled shape above the sea bed. This is possible under wave configuration riser conditions or where a flowline must bridge unstable, aggressive, environmentally sensitive or active sea bed conditions.

In accordance with embodiments of the present invention the variation of support provided to a flexible pipe may be controlled in a wide variety of ways not necessarily including weight and buoyancy elements but rather by biasing elements such, as springs, elastic elements or similar means. For example, an alternative could be any self righting or self adjusting member which is attached to the pipe or pipe ancillaries in order to adjust the downward force experienced by the pipe. This could be:

Heavy cable, heave rope—chain like structure
Heavy steel/concrete bar or block or any other shape.
These also have some self adjusting function when they are partly left from the sea bed.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

We claim:

1. A method of supporting a flexible pipe in a wave configuration for transporting production fluids from a subsea location to a floating facility, the method comprising:
   responsive to a change in buoyancy experienced by a flexible pipe, increasing and/or decreasing an amount of buoyant support provided at a plurality of locations on the flexible pipe by decreasing and/or increasing a downward force applied to the flexible pipe, provided by a weight chain, flexible filament or biasing element, extending between a portion of the flexible pipe or a buoyancy module secured to the flexible pipe and a seabed region.

2. The method as claimed in claim 1, wherein the wave configuration comprises at least one wave comprising a crest region and a valley region extending from the crest region, the crest region defining a concave curve with respect to the seabed and the valley region defining a convex curve with respect to the seabed.

3. The method as claimed in claim 1, further comprising:
   over a period of time, continuously and automatically varying the amount of buoyant support provided to the flexible pipe by continuously and automatically varying the downward force as conditions experienced by the pipe vary.

4. The method as claimed in claim 1, further comprising:
   varying the amount of buoyant support provided to the flexible pipe by increasing and/or decreasing an amount of weight suspended at one of the said locations.

5. The method as claimed in claim 4, further comprising:
   increasing and/or decreasing the amount of buoyant support provided to the flexible pipe by respectively decreasing and/or increasing the amount of weight provided by a weight chain suspended from a portion of the flexible pipe or suspended from a buoyancy module secured to the flexible pipe.

6. The method as claimed in claim 5, further comprising:
   supporting a portion of the weight chain on a sea bed region, a proportion of the weight chain being supported on the sea bed region determining the amount of weight suspended from the flexible pipe or suspended from the buoyancy module secured to the flexible pipe.

7. The method as claimed in claim 1, further comprising:
   varying the amount of buoyant support provided to the flexible pipe by varying a downward force, provided by a biasing element, applied to the flexible pipe.

8. The method as claimed in claim 1, wherein the amount of buoyant support provided at the plurality of locations on the flexible pipe is automatically increased and decreased as the buoyancy experienced by the flexible pipe increases and decreases, respectively, from changing density of a fluid being transported in the flexible pipe.

9. A flexible pipe supported in a wave configuration for transporting production fluids from a subsea location to a floating facility, comprising:
   a flexible pipe and a weight chain, flexible filament or biasing element extending between a portion of the flexible pipe or a buoyancy module secured to the flexible pipe and a seabed region,
   wherein an amount of buoyant support provided to the pipe at a plurality of locations on the flexible pipe is increased and/or decreased responsive to a change in buoyancy experienced by the flexible pipe as a result of decreased and/or increased downward force applied to the flexible pipe by the weight chain, flexible filament or biasing element.

10. The method as claimed in claim 9, wherein the wave configuration comprises at least one wave that curves upwardly away from the seabed, back downwardly toward the seabed, and then back upwardly away from the seabed.

11. The flexible pipe as claimed in claim 9, wherein:
the amount of buoyant support provided to the flexible pipe is varied continuously and automatically as conditions experienced by the pipe vary.

12. The flexible pipe as claimed in claim 9, wherein:
at least one buoyancy module is secured at a respective location to the flexible pipe.

13. The flexible pipe as claimed in claim 12, wherein:
a weight chain is secured to the buoyancy module.

14. The flexible pipe as claimed in claim 13, wherein:
a length of each weight chain is selected so that a portion of each weight chain is supported on the sea bed region.

15. The flexible pipe as claimed in claim 9, wherein:
at least one weight chain is secured at a respective location to the flexible pipe.

16. A jumper or riser or flowline comprising the flexible pipe as claimed in claim 9.

17. A method of transporting a fluid, comprising:
transporting a fluid through a flexible pipe supported in a wave configuration disposed in a subsea environment;
the flexible pipe being supported at a plurality of locations wherein an amount of buoyant support provided to the pipe is increased and/or decreased at the plurality of locations, responsive to a change in buoyancy experienced by the flexible pipe, by decreasing and/or increasing a downward force applied to the flexible pipe, provided by a weight chain, flexible filament or biasing element, extending between a portion of the flexible pipe or a buoyancy module secured to the flexible pipe and a seabed region.

18. The method as claimed in claim 17, wherein:
a first end of the flexible pipe is connected to a subsea location and a second end of the flexible pipe is connected to a floating facility such that the fluid is transported from a subsea location to a floating vessel via the pipe;
the wave configuration of the flexible pipe comprises at least one wave comprising a crest region and a valley region extending from the crest region, the crest region defining a concave curve with respect to the seabed and the valley region defining a convex curve with respect to the seabed;
the flexible pipe being supported in the wave configuration by a plurality of the buoyancy modules secured to the flexible pipe at least partially along the crest region of the at least one wave;
the decreasing and/or increasing of the downward force applied to the flexible pipe is provided by a plurality of weight chains comprising interlocked links, each extending between a portion of the flexible pipe or a buoyancy module secured to the flexible pipe and a seabed region; and a portion of one of the weight chains is supported on a sea bed region, a proportion of the weight chain being supported on the sea bed region determining the amount of weight suspended from the flexible pipe or suspended from the buoyancy module secured to the flexible pipe at a particular location.

19. The method as claimed in claim 17, wherein the wave configuration comprises at least one wave comprising a crest region and a valley region extending from the crest region, the crest region defining a concave curve with respect to the seabed and the valley region defining a convex curve with respect to the seabed.

20. The method of claim 18, wherein the one of the weight chains has a weight and length such that a decrease in buoyancy experienced by the flexible pipe increases an amount of slack in the one of the weight chains that is supported on the sea bed region and an increase in buoyancy experienced by the flexible pipe decreases the amount of slack in the one of the weight chains that is supported on the sea bed region.

21. A method of transporting a fluid, comprising:
transporting a fluid through a flexible pipe supported in a wave configuration disposed in a subsea environment, wherein the wave configuration comprises at least one wave comprising a crest region and a valley region extending from the crest region, the crest region defining a concave curve with respect to the seabed and the valley region defining a convex curve with respect to the seabed, and wherein the flexible pipe is supported in the wave configuration by a plurality of the buoyancy modules secured to the flexible pipe at a plurality of spaced apart locations along the length of the crest region of the at least one wave;
the flexible pipe being supported at the plurality of locations wherein an amount of buoyant support provided to the pipe is increased and/or decreased at the plurality of locations, responsive to a change in buoyancy experienced by the flexible pipe, by decreasing and/or increasing a downward force applied to the flexible pipe, provided by a plurality of weight chains connected to the buoyancy modules at the plurality of spaced apart locations along the length of the crest region of the at least one wave, each weight chain extending from a respective buoyancy module to a seabed region;
wherein a first end of the flexible pipe is connected to a subsea location and a second end of the flexible pipe is connected to a floating facility such that the fluid is transported from a subsea location to a floating vessel via the pipe;
a portion of each weight chain being supported on the sea bed region, wherein a proportion of each weight chain being supported on the sea bed region determines the amount of weight suspended from the corresponding buoyancy module secured to the flexible pipe at a particular location.

* * * * *